(12) United States Patent
Li (10) Patent No.: US 7,086,395 B1
(45) Date of Patent: Aug. 8, 2006

(54) BARBEQUE GRILL ASSEMBLY WITH DETACHABLE LEG UNITS

(75) Inventor: Chung-Shuan Li, Yung-Kang (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 11/047,326

(22) Filed: Jan. 31, 2005

(51) Int. Cl.
*A47J 37/00* (2006.01)
(52) U.S. Cl. .................. 126/25 R; 126/9 R; 126/304 A
(58) Field of Classification Search .............. 126/25 R, 126/9 R, 304 R, 304 A, 38, 305, 40, 50, 126/39 R, 41 R, 306; 108/157.1, 159.12, 108/115; 248/188, 167; 52/65, 66, 67
See application file for complete search history.

(56) References Cited

U.S. PATENT DOCUMENTS

| | | | | | |
|---|---|---|---|---|---|
| 2,911,265 | A | * | 11/1959 | Hannah | .................... 182/186.5 |
| 4,166,413 | A | * | 9/1979 | Meszaros | ..................... 99/393 |
| 4,210,118 | A | * | 7/1980 | Davis et al. | .............. 126/25 R |
| 4,492,215 | A | * | 1/1985 | DiGianvittorio | ............ 126/9 R |
| 4,747,469 | A | * | 5/1988 | Phillips | .................... 182/186.5 |
| 6,412,480 | B1 | * | 7/2002 | Harbin | ...................... 126/25 R |
| 2003/0106546 | A1 | * | 6/2003 | Wu | .......................... 126/41 R |

FOREIGN PATENT DOCUMENTS

TW 379560Y Y * 11/2000

* cited by examiner

*Primary Examiner*—Cheryl Tyler
*Assistant Examiner*—Michael J. Early
(74) *Attorney, Agent, or Firm*—Ladas & Parry LLP (57) ABSTRACT

A barbeque grill assembly includes a base unit, a barbeque grill mounted on top of the base unit, and a pair of leg units. The base unit includes a pair of leg coupling seats provided respectively on opposite lateral sides of a base plate. Each leg unit includes a pair of leg members connected by a foldable stretcher. The leg members of each leg unit have upper insert ends inserted removably into corresponding insert grooves formed in a respective one of the leg coupling seats. The leg units are operable so as to be disposed from a removable state, in which movement of the insert ends of the leg members into and out of the insert grooves is permitted, to a supporting state, in which removal of the base unit from the leg units is prevented.

8 Claims, 6 Drawing Sheets

BARBEQUE GRILL ASSEMBLY WITH DETACHABLE LEG UNITS

BACKGROUND OF THE INVENTION

1. Field of the Invention

The invention relates to a barbeque grill assembly, more particularly to a barbeque grill assembly with detachable leg units.

2. Description of the Related Art

A conventional barbeque grill assembly generally includes a grill device, and a stand for supporting the grill device on a surface. It is desirable to configure the stand to be detachable from the grill device and to be foldable in order to facilitate storage of the barbeque grill assembly.

SUMMARY OF THE INVENTION

The object of the present invention is to provide a barbeque grill assembly with leg units that are foldable and that can be easily attached and detached from a base unit.

Accordingly, the barbeque grill assembly of the present invention comprises abase unit, a barbeque grill, and a pair of leg units. The base unit includes a base plate and a pair of leg coupling seats. The base plate has a top side, defines a central reference plane that is transverse to the top side and that extends in a first direction, and further has a pair of lateral sides opposite to each other in the first direction. The leg coupling seats are provided respectively on the lateral sides of the base plate. Each of the leg coupling seats has a bottom side formed with a pair of insert grooves that are spaced apart from each other in a second direction transverse to the first direction and that are disposed on opposite sides of the central reference plane. Each of the insert grooves has inner and outer groove walls respectively proximate to and distal from the central reference plane. The inner groove wall includes a first inclined wall section that inclines upwardly toward the central reference plane. The barbeque grill is mounted on top of the base unit. Each of the leg units includes a pair of leg members and a foldable stretcher interconnecting the leg members. Each of the leg members has an upper insert end inserted removably into a corresponding one of the insert grooves in a respective one of the leg coupling seats.

The leg units are operable so as to be disposed from a removable state, in which the stretcher of each of the leg units is folded to bring the leg members of each of the leg units closer to each other and in which the leg members of the leg units are generally upright such that the outer groove walls and the first inclined wall sections of the inner groove walls of the insert grooves do not hinder movement of the insert ends of the leg members of the leg units into and out of the insert grooves, to a supporting state, in which the leg members of each of the leg units are moved apart so as to unfold the stretcher of each of the leg units and so as to enable the insert ends of the leg members of the leg units to abut against the outer groove walls and the first inclined wall sections of the inner groove walls of the insert grooves, thereby preventing removal of the base unit from the leg units.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 1:
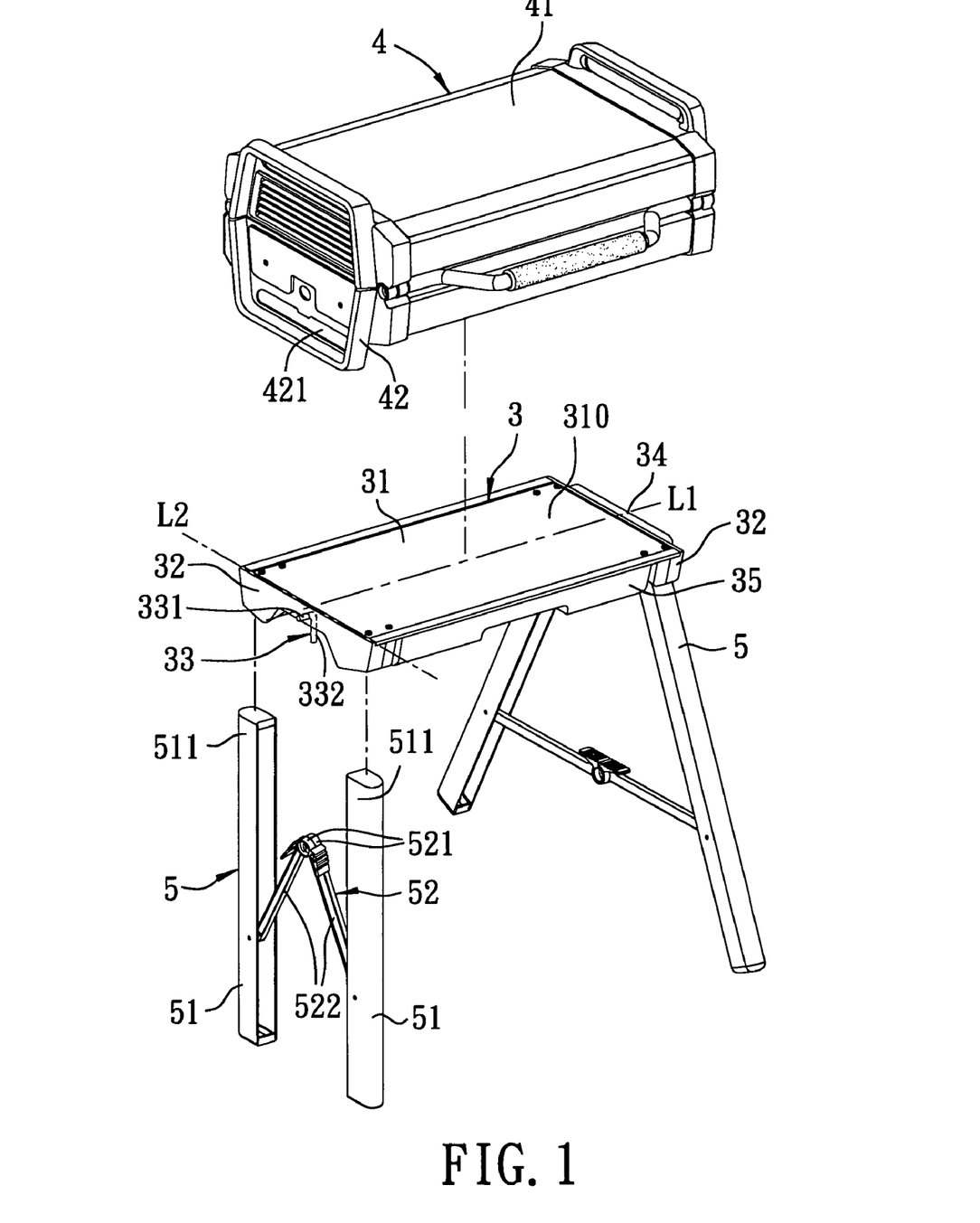
FIG. 1 is a partly exploded, perspective view of the preferred embodiment of a barbeque grill assembly according to the present invention.
Figure 2:
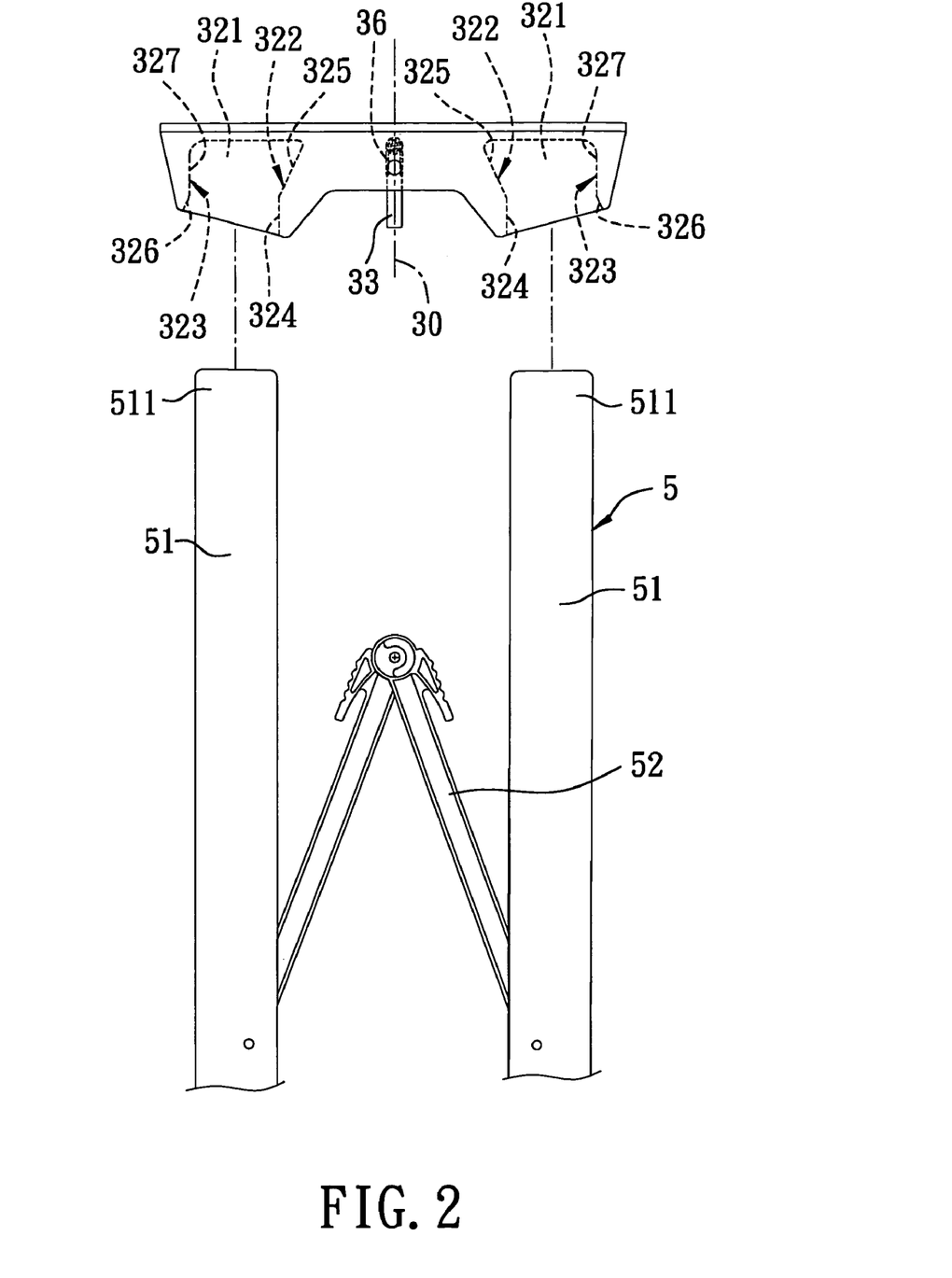
FIG. 2 is a partly exploded, schematic side view to illustrate a base unit and a leg unit of the preferred embodiment.

Referring to FIGS. 1 and 2, the preferred embodiment of a barbeque grill assembly according to the present invention is shown to include a base unit 3, a barbeque grill 4 mounted on top of the base unit 3, and a pair of leg units 5 connected removably to the base unit 3.

The base unit 3 includes a base plate 31 and left and right leg coupling seats 32. The base plate 31 has atop side 310 (see FIG. 2), defines a central reference plane 30 that is transverse to the top side 310 and that extends in a first direction (L1), and further has left and right lateral sides opposite to each other in the first direction (L1). The left and right leg coupling seats 32 are provided respectively on the left and right lateral sides of the base plate 31. Each of the leg coupling seats 32 has a bottom side formed with a pair of insert grooves 321 that are spaced apart from each other in a second direction (L2) transverse to the first direction (L1) and that are disposed on opposite sides of the central reference plane 30. Each of the insert grooves 321 has inner and outer groove walls 322, 323 respectively proximate to and distal from the central reference plane 30. The inner groove wall 322 of each of the insert grooves 321 includes a first inclined wall section 325 that inclines upwardly toward the central reference plane 30, and a first straight wall section 324 that extends downwardly from the first inclined wall plane 30. The outer groove wall 323 of each of the insert grooves 321 includes a second inclined wall section 326 parallel to the first inclined wall section 325 of the inner groove wall 322 of the corresponding one of the insert grooves 321, and a second straight wall section 327 that extends upwardly from the second inclined wall section 326 and that is parallel to the first straight wall section 324 of the inner groove wall 322 of the corresponding one of the insert grooves 321.

The base unit 3 further includes a locking rib 34 that projects in the first direction (L1) from the right leg coupling seat 32 away from the left leg coupling seat 32, and a latching member 33 that is mounted movably and operably on the left leg coupling seat 32 and that is operable so as to project or retract in the first direction (L1) relative to the left leg coupling seat 32. In this embodiment, with further reference to FIG. 3, the latching member 33 is generally L-shaped, and includes a horizontal positioning section 331 that extends movably through the left leg coupling seat 32, and a vertical operating section 332 that is connected to an inner end of the positioning section 331. By manipulating the operating section 332, the length of the positioning section 331 that projects laterally and outwardly through the left leg coupling seat 32 can be controlled. The positioning section 331 is formed with an annular groove 333. Preferably, the base unit 3 further includes a positioning clip 36 (see FIG. 2) that is provided on the left leg coupling seat 32 and that engages releasably the positioning section 331 at the annular groove 333 so as to arrest undesired movement of the latching member 33.

In this embodiment, the base unit 3 further includes a drawer 35 disposed slidably between the leg coupling seats 32 for receiving utensils therein.

The barbeque grill 4 is mounted on top of the base unit 3, and includes a grill housing 41 and left and right side frames 42 that extend downwardly and respectively from opposite lateral sides of the grill housing 41. Each of the side frames 42 is formed with an elongate latch hole 421 that extends in the second direction (L2).

Figure 3:
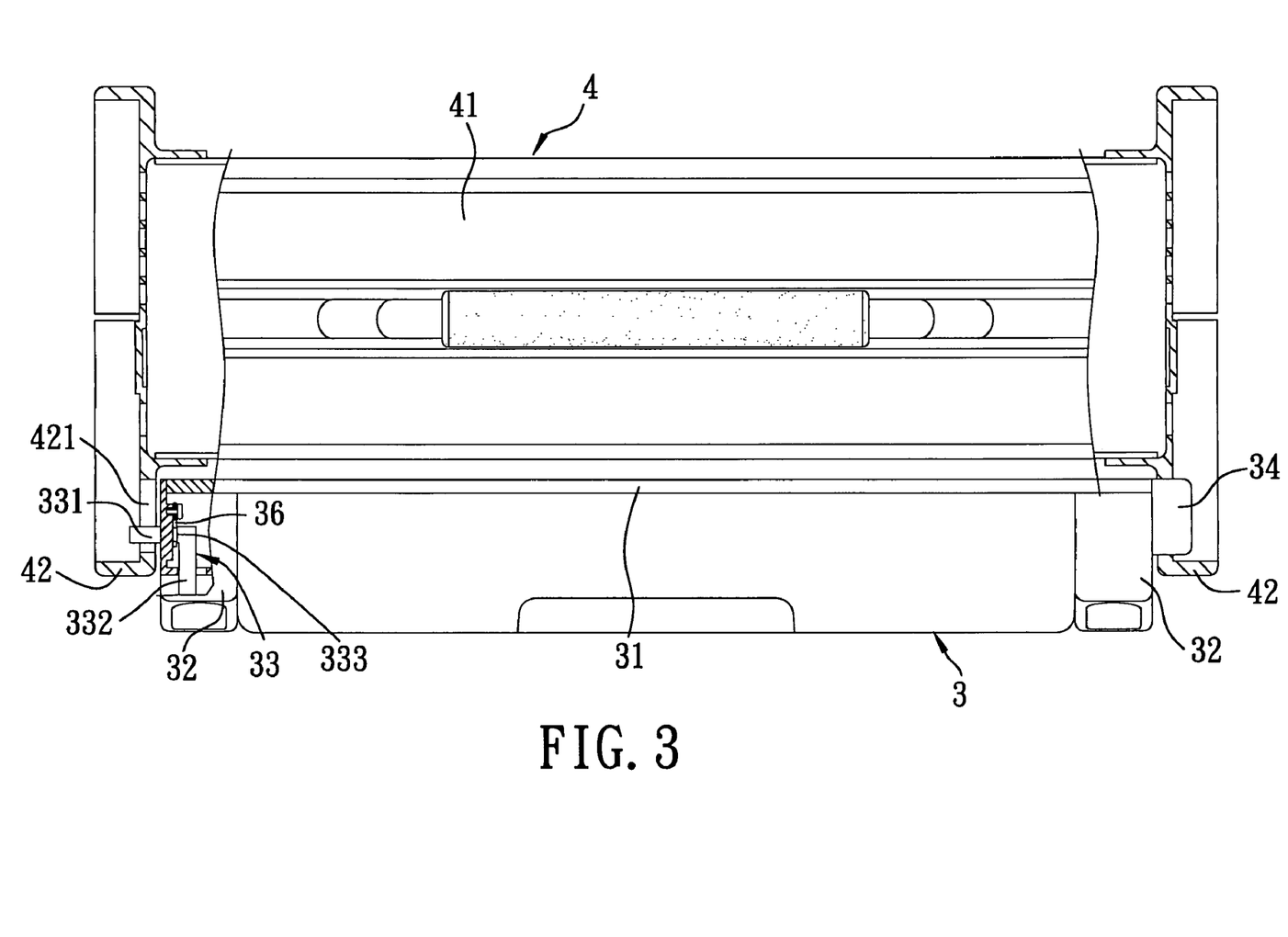
FIG. 3 is a fragmentary, partly sectional, schematic front view to illustrate the base unit and a barbeque grill of the preferred embodiment.

When the barbeque grill 4 is disposed on top of the base plate 31 of the base unit 3 such that the leg coupling seats 32 are confined between the side frames 42, the locking rib 34 is extended into the latch hole 421 in the right side frame 42, and the operating section 332 of the latching member 33 is manipulated to enable extension of the positioning section 331 into the latch hole 421 in the left side frame 42. Thereafter, when the positioning clip 36 engages the annular groove 333 in the positioning section 331 of the latching member 33, undesired removal of the latching member 33 from the latch hole 421 in the left side frame 42 is prevented by the positioning clip 36, thereby retaining removably the barbeque grill 4 on the base unit 3, as best shown in FIG. 3.

To dismount the barbeque grill 4 from the base unit 3, the operating section 332 of the latching member 33 is manipulated to retract the positioning section 331 such that the positioning clip 36 is disengaged from the annular groove 333, and such that the positioning section 331 ceases to extend into the latch hole 421 in the left side frame 42. The barbeque grill 4 is then tilted upwardly from the base unit 3 such that the locking rib 34 ceases to extend into the latch hole 421 in the right side frame 42, thereby permitting removal of the barbeque grill 4 from the base unit 3.

Figure 6:
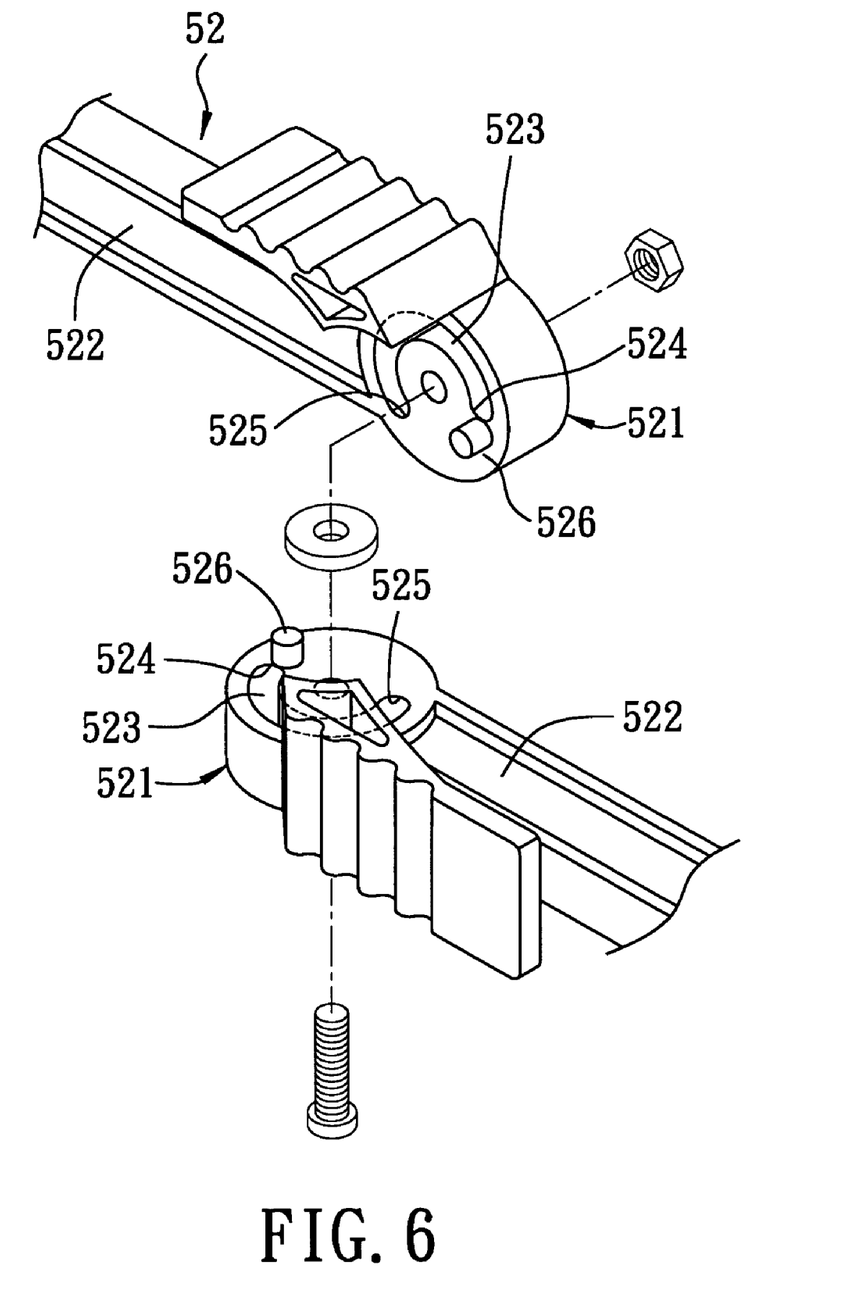
FIG. 6 is a fragmentary exploded perspective view of a stretcher of a leg unit of the preferred embodiment.

Each of the leg units 5 includes a pair of leg members 51 and a foldable stretcher 52 interconnecting the leg members 51. Each of the leg members 51 has an upper insert end 511 inserted removably into a corresponding one of the insert grooves 321 in a respective one of the leg coupling seats 32. With further reference to FIG. 6, the stretcher 52 of each of the leg units 5 includes a pair of couplers 521 that are coupled rotatably to each other, and a pair of links 522, each of which extends from a respective one of the couplers 521 and is connected pivotally to a respective one of the leg members 51.

Each of the couplers 521 has one side that confronts the other one of the couplers 521 and that is formed with a C-shaped slide groove 523 and a guide pin 526. The C-shaped slide groove 523 has a first end 525 proximate to the link 522, and a second end 524 distal from the link 522. The guide pin 526 is disposed adjacent to the second end 524 of the C-shaped slide groove 523 and is movably received in the C-shaped slide groove 523 of the other one of the couplers 521.

Figure 4:
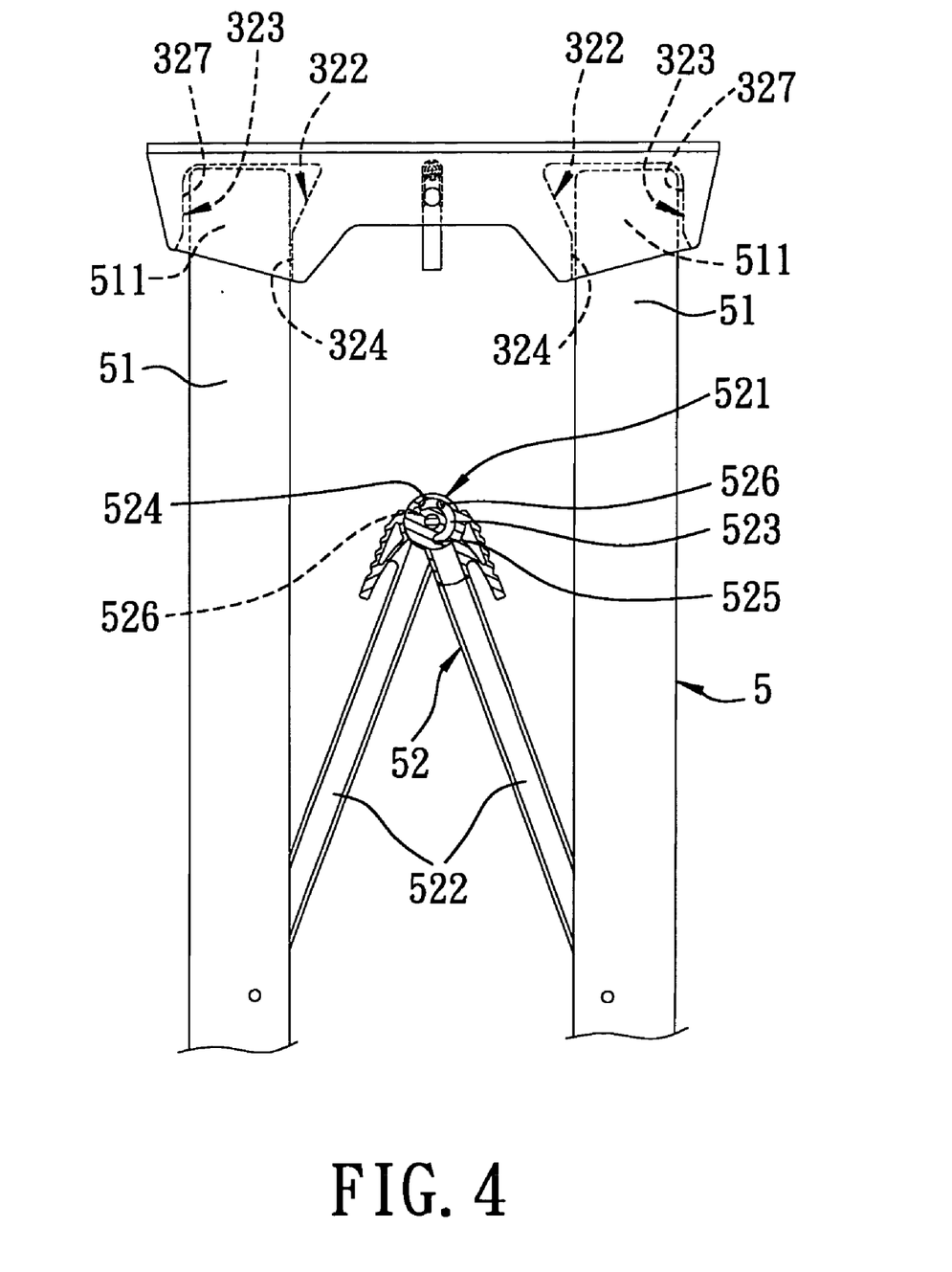
FIG. 4 is an assembled schematic side view of the preferred embodiment, illustrating a removable state of the leg unit.
Figure 5:
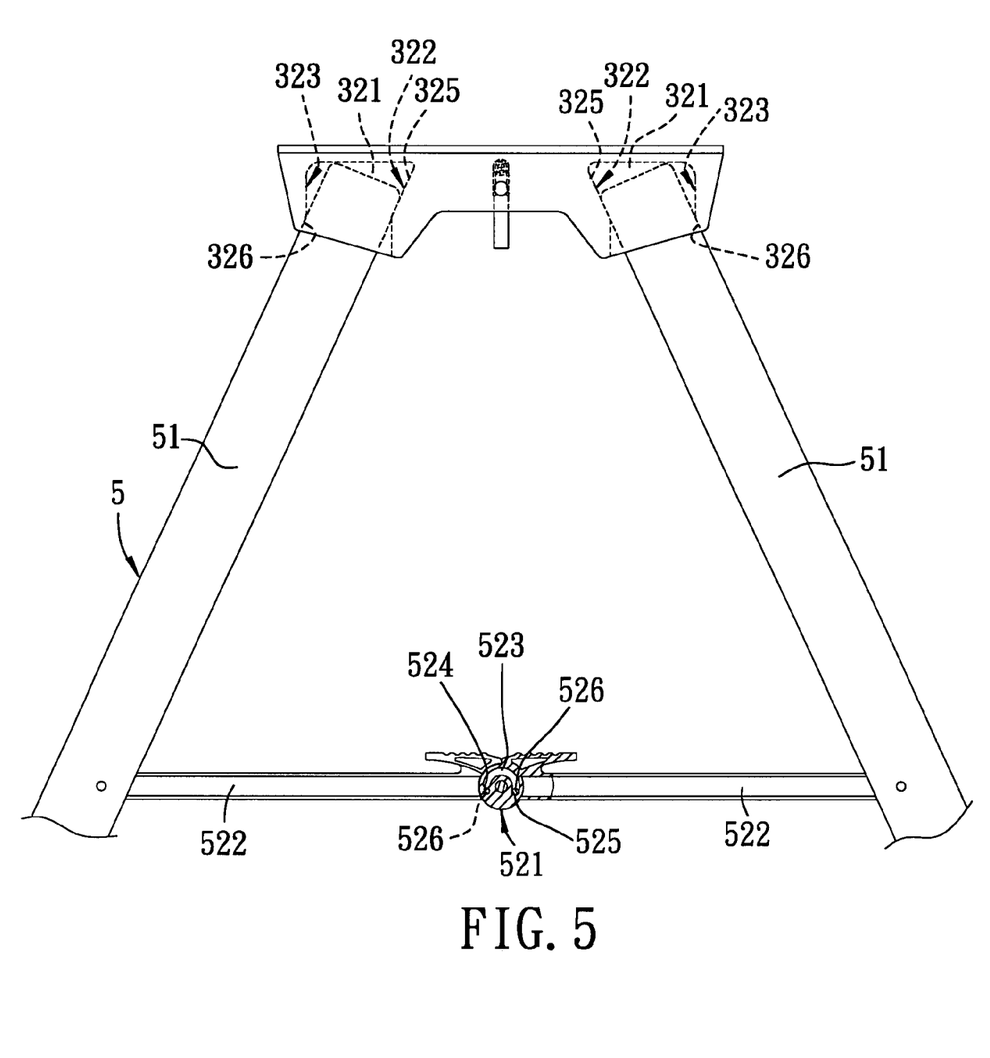
FIG. 5 is a view similar to FIG. 4, but illustrating a supporting state of the leg unit.

The leg units 5 are operable so as to be disposed from a removable state (see FIG. 4) to a supporting state (see FIG. 5). In the removable state, the stretcher 52 of each of the leg units 5 is folded to bring the leg members 51 of each of the leg units 5 closer to each other, and the leg members 51 of the leg units 5 are generally upright such that the outer groove walls 323 and the first inclined wall sections 325 of the inner groove walls 322 of the insert grooves 321 do not hinder movement of the insert ends 511 of the leg members 51 of the leg units 5 into and out of the insert grooves 321. When the leg units 5 are at the removable state, each of the guide pins 526 is disposed midway in the corresponding C-shaped slide groove 523, as shown in FIG. 4. In the supporting state, the leg members 51 of each of the leg units 5 are moved apart so as to unfold the stretcher 52 of each of the leg units 5 and so as to enable the insert ends 511 of the leg members 51 of the leg units 5 to abut against the second inclined wall sections 326 of the outer groove walls 323 and the first inclined wall sections 325 of the inner groove walls 322 of the insert grooves 321, thereby preventing removal of the base unit 3 from the leg units 5. When the leg units 5 are at the supporting state, each of the guide pins 526 is disposed and positioned at the first end 525 of the corresponding C-shaped slide groove 523, as shown in FIG. 5.

When it is intended to remove the leg units 5 from the base unit 3, an upward force is exerted at the couplers 521 of the stretchers 52, thereby causing relative rotation between the couplers 521 and thereby moving the links 522 toward each other. As a result, the leg units 5 are disposed once again at the removable state to permit movement of the insert ends 511 of the leg members 51 of the leg units 5 out of the insert grooves 321, as best shown in FIG. 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A barbeque grill assembly comprising:
   a base unit including a base plate having a top side, defining a central reference plane that is transverse to said top side and that extends in a first direction, and further having a pair of lateral sides opposite to each other in the first direction, and a pair of leg coupling seats provided respectively on said lateral sides of said base plate, each of said leg coupling seats having a bottom side formed with a pair of insert grooves that are spaced apart from each other in a second direction transverse to the first direction and that are disposed on opposite sides of the central reference plane, each of said insert grooves having inner and outer groove walls respectively proximate to and distal from the central reference plane, said inner groove wall including a first inclined wall section that inclines upwardly toward the central reference plane;
   a barbeque grill mounted on top of said base unit; and
   a pair of leg units, each of which includes a pair of leg members and a foldable stretcher interconnecting said leg members, each of said leg members having an upper insert end inserted removably into a corresponding one of said insert grooves in a respective one of said leg coupling seats,
   said leg units being operable so as to be disposed from a removable state, in which said stretcher of each of said leg units is folded to bring said leg members of each of said leg units closer to each other and in which said leg members of said leg units are generally upright such that said outer groove walls and said first inclined wall sections of said inner groove walls of said insert grooves do not hinder movement of said insert ends of said leg members of said leg units into and out of said insert grooves, to a supporting state, in which said leg members of each of said leg units are moved apart so as to unfold said stretcher of each of said leg units and so as to enable said insert ends of said leg members of said leg units to abut against said outer groove walls and said first inclined wall sections of said inner groove walls of said insert grooves, thereby preventing removal of said base unit from said leg units;

wherein said inner groove wall of each of said insert grooves further includes a first straight wall section that extends downwardly from said first inclined wall section and that is parallel to the central reference plane.

2. The barbeque grill assembly as claimed in claim 1, wherein said outer groove wall of each of said insert grooves includes a second inclined wall section parallel to said first inclined wall section of said inner groove wall of the corresponding one of said insert grooves, and a second straight wall section that extends upwardly from said second inclined wall section and that is parallel to said first straight wall section of said inner groove wall of the corresponding one of said insert grooves.

3. A barbeque grill assembly comprising:

a base unit including a base plate having a top side, defining a central reference plane that is transverse to said top side and that extends in a first direction, and further having a pair of lateral sides opposite to each other in the first direction, and a pair of leg coupling seats provided respectively on said lateral sides of said base plate, each of said leg coupling seats having a bottom side formed with a pair of insert grooves that are spaced apart from each other in a second direction transverse to the first direction and that are disposed on opposite sides of the central reference plane, each of said insert grooves having inner and outer groove walls respectively proximate to and distal from the central reference plane, said inner groove wall including a first inclined wall section that inclines upwardly toward the central reference plane;

a barbeque grill mounted on top of said base unit; and a pair of leg units, each of which includes a pair of leg members and a foldable stretcher interconnecting said leg members, each of said leg members having an upper insert end inserted removably into a corresponding one of said insert grooves in a respective one of said leg coupling seats, said leg units being operable so as to be disposed from a removable state, in which said stretcher of each of said leg units is folded to bring said leg members of each of said leg units closer to each other and in which said leg members of said leg units are generally upright such that said outer groove walls and said first inclined wall sections of said inner groove walls of said insert grooves do not hinder movement of said insert ends of said leg members of said leg units into and out of said insert grooves, to a supporting state, in which said leg members of each of said leg units are moved apart so as to unfold said stretcher of each of said leg units and so as to enable said insert ends of said leg members of said leg units to abut against said outer groove walls and said first inclined wall sections of said inner groove walls of said insert grooves, thereby preventing removal of said base unit from said leg units;

wherein said base unit further includes a locking rib that projects in the first direction from one of said leg coupling seats away from the other of said leg coupling seats, and a latching member that is mounted movably and operably on the other of said leg coupling seats and that is operable so as to project or retract in the first direction relative to the other of said leg coupling seats;

said barbeque grill including a grill housing and a pair of side frames that extend downwardly and respectively from opposite lateral sides of said grill housing, each of said side frames being formed with a latch hole;

said leg coupling seats being confined between said side frames when said barbeque grill is disposed on top of said base plate of said base unit;

said locking rib being extended into said latch hole in one of said side frames, and said latching member being operated to extend into said latch hole in the other of said side frames so as to retain removably said barbeque grill on said base unit.

4. The barbeque grill assembly as claimed in claim 3, wherein said latching member includes a positioning section that extends movably through the other of said leg coupling seats, and an operating section that is connected to one end of said positioning section, said positioning section being formed with an annular groove, said base unit further including a positioning clip to engage releasably said positioning section at said annular groove so as to arrest undesired movement of said latching member.

5. The barbeque grill assembly as claimed in claim 1, wherein said base unit further includes a drawer disposed slidably between said leg coupling seats.

6. A barbecue grill assembly comprising:

a base unit including a base plate having a top side, defining a central reference plane that is transverse to said top side and that extends in a first direction, and further having a pair of lateral sides opposite to each other in the first direction, and a pair of leg coupling seats provided respectively on said lateral sides of said base plate, each of said leg coupling seats having a bottom side formed with a pair of insert grooves that are spaced apart from each other in a second direction transverse to the first direction and that are disposed on opposite sides of the central reference plane, each of said insert grooves having inner and outer groove walls respectively proximate to and distal from the central reference plane, said inner groove wall including a first inclined wall section that inclines upwardly toward the central reference plane;

a barbecue grill mounted on top of said base unit; and a pair of leg units, each of which includes a pair of leg members and a foldable stretcher interconnecting said leg members, each of said leg members having an upper insert end inserted removably into a corresponding one of said insert grooves in a respective one of said leg coupling seats, said leg units being operable so as to be disposed from a removable state, in which said stretcher of each of said leg units is folded to bring said leg members of each of said leg units closer to each other and in which said leg members of said leg units are generally upright such that said outer groove walls and said first inclined wall sections of said inner groove walls of said insert grooves do not hinder movement of said insert ends of said leg members of said leg units into and out of said insert grooves, to a supporting state, in which said leg members of each of said leg units are moved apart so as to unfold said stretcher of each of said leg units and so as to enable said insert ends of said leg members of said leg units to abut against said outer groove walls and said first inclined wall sections of said inner groove walls of said insert grooves, thereby preventing removal of said base unit from said leg units;

wherein said stretcher of each of said leg units includes a pair of couplers that are coupled rotatably to each other, and a pair of links, each of which extends from a respective one of said couplers and is connected pivotally to a respective one of said leg members;

wherein each of said couplers has one side that confronts the other one of said couplers and that is formed with a C-shaped slide groove and a guide pin adjacent to one end of said C-shaped slide groove and movably received in said C-shaped slide groove of the other one of said couplers.

7. The barbeque grill assembly as claimed in claim 3, wherein said base unit further includes a drawer disposed slidably between said leg coupling seats.

8. The barbeque grill assembly as claimed in claim 6, wherein said base unit further includes a drawer disposed slidably between said leg coupling seats.

* * * * *